United States Patent
Ohzeki et al.

(10) Patent No.: US 6,759,169 B1
(45) Date of Patent: Jul. 6, 2004

(54) GRAPHITE POWDER FOR NEGATIVE ELECTRODE OF LITHIUM ION SECONDARY CELL AND METHOD OF PRODUCTION THEREOF

(75) Inventors: Katsutomo Ohzeki, Narita (JP); Shigemi Oyama, Chiba (JP); Minoru Shirahige, Chiba (JP)

(73) Assignee: Hitachi Powdered Metals Co., Ltd., Chiba (JP)

( * ) Notice: Subject to any disclaimer, the term of this patent is extended or adjusted under 35 U.S.C. 154(b) by 0 days.

(21) Appl. No.: 09/254,316

(22) PCT Filed: Jul. 6, 1998

(86) PCT No.: PCT/JP98/03031

§ 371 (c)(1),
(2), (4) Date: Mar. 4, 1999

(87) PCT Pub. No.: WO99/01904

PCT Pub. Date: Jan. 14, 1999

(30) Foreign Application Priority Data

Jul. 4, 1997 (JP) ............................................. 9-194791

(51) Int. Cl.[7] ............................................... C01B 31/04
(52) U.S. Cl. ..................................... 429/231.8; 252/510
(58) Field of Search ................................ 423/448, 265; 429/231.8; 252/510

(56) References Cited

U.S. PATENT DOCUMENTS 5,288,429 A * 2/1994 von Bonin et al. .......... 423/448
5,908,715 A * 6/1999 Liu et al. ................. 429/231.8

FOREIGN PATENT DOCUMENTS

| JP | A5-234592 | 9/1993 |
| JP | A6-5288 | 1/1994 |
| JP | 6-052860 | 2/1994 |
| JP | 6-295725 | 10/1994 |
| JP | A7-235328 | 9/1995 |
| JP | A7-302593 | 11/1995 |
| JP | 8-045548 | 2/1996 |
| JP | A9-147916 | 6/1997 |
| JP | 9-213335 | 8/1997 |
| JP | 9-249407 | 9/1997 |
| JP | A9-293498 | 11/1997 |
| JP | A9-320596 | 12/1997 |

* cited by examiner

Primary Examiner—Stuart Hendrickson
(74) Attorney, Agent, or Firm—Birch, Stewart, Kolasch & Birch, LLP

(57) ABSTRACT

A method of producing graphite powder for a negative electrode of a lithium ion secondary cell excellent in discharge/charge efficiency (Coulomb efficiency) and having a high capacity retention rate, wherein 0.01 to 10 wt % (on the basis of the graphite material) of a starch derivative having $C_6H_{10}O_5$ as a basic structure or other surface active materials are allowed to be adsorbed by or to coat the surface of a graphite material for a negative electrode capable of occluding and releasing lithium ions and furthermore at least one kind of metal elements selected from the group consisting of lithium, calcium, magnesium, sodium and potassium is added.

2 Claims, No Drawings

GRAPHITE POWDER FOR NEGATIVE ELECTRODE OF LITHIUM ION SECONDARY CELL AND METHOD OF PRODUCTION THEREOF

This application is the national phase under 35 U.S.C. §371 of prior PCT International Application No. PCT/JP98/03031 which has an International filing date of Jul. 6, 1998 which designated the United States of America.

TECHNICAL FIELD

The present invention relates to graphite powder used for negative electrodes of lithium ion secondary cells (batteries). More particularly, this invention relates to the graphite powder, which is capable of improving the discharge/charge efficiency and the discharge capacity of the cell and a method for producing the same.

BACKGROUND ART

As the material for a negative electrode of lithium ion secondary cells, carbon materials such as graphite and carbon are used in practice owing to the advantage in that the formation of needle crystals of lithium dendrite can be avoided during the charging and discharging. In order to adjust the particle size of the carbon mate rial to a level as desired, they are subjected to dry grinding in most cases. That is, they are ground by using a jet mill or the like to obtain their particles of a certain particle size by means of recovering with a cyclone. The obtained particles are then sieved to produce the particles in a certain range in particle size to be used. The particles of carbon material obtained by dry grinding have many active sites on the minute surfaces that are newly formed in the grinding. The carbon material having the above-mentioned active sites often cause the decomposition of electrolytes or the formation of irreversible lithium compound. For this reason, the high capacity and high reversibility required of the carbon material for lithium ion secondary cell are influenced adversely. In other words, the high Coulomb efficiency and the long-term storage life are adversely influenced; as a result, the characteristic properties of obtainable lithium ion secondary cells are impaired.

In order to solve these problems, the use of graphite material substantially containing none of fine graphite particles of 10 $\mu$m or less in particle size is disclosed in Japanese Laid-Open Publication No. H06-52860. Furthermore, disclosed in Japanese Laid-Open Patent Publication No. H06-295725 is graphite material for negative electrodes, which graphite material has an average particle size in the range of 10–30 $\mu$m and a specific surface area (BET value) in the range of 1–10 m$^2$/g, and the quantities of graphite particles of less than 10 $\mu$m and more than 30 $\mu$m in particle sizes are limited to a value not more than 10%.

Furthermore, it is disclosed in Japanese Laid-Open Patent Publication No. H09-213335 to incorporate at least one element selected from the group of Mg, Al, Si, Ca, Sn and Pb into the carbon material for the negative electrode of lithium ion secondary cells by means of mixing the carbon material with at least one member of Mg$_2$S, Al$_4$C$_3$, tin oxalate and CaC$_3$ which is followed by the treatment of sintering.

Still further, disclosed in Japanese Laid-Open Patent Publication No. H09-249407 is a material for negative electrode of lithium cells, which material is prepared by forming mechano-chemically a graphite composite using graphite particles and solid element particles of Li, Al, Sn, Pb and Cd.

Furthermore, disclosed in Japanese Laid-Open Patent Publication No. H08-45548 is that the material for negative electrode of lithium secondary cell is added or plated with 3–10 wt. % of at least one kind of metallic powder element selected from the group consisting of gold, silver, copper, nickel and chromium.

However, in the carbon materials (including graphite) which are obtained by dry grinding, the formation of active site on the surfaces of particles cannot be avoided, as described above. Furthermore, in the case of the carbon material prepared by dry grinding, the carbon material substantially contains fine particles even when the particle size is controlled by sieving or cyclone recovering, because the particle size is not controlled in the stage of the primary particles. That is, in the fine particles of less than 1 $\mu$m in particle size obtained by dry grinding have high surface energy so that the particles aggregate during the dry grinding process to form the secondary particles of several tens of $\mu$m in particle diameter.

DISCLOSURE OF INVENTION

The present invention has been accomplished in order to solve the above-described problems. Several graphite materials such as natural graphite, artificial graphite, kish graphite, mesophase carbon micro-beads (MCMB), mesophase carbon micro-fiber (MCF) and resin carbonized graphite which can occlude and release lithium ions, are used as the graphite materials for negative electrodes of lithium ion secondary cells. The carbon material proposed by the present invention is prepared by causing the surfaces of graphite material to adsorb or to be coated by 0.01 to 10 wt. % (on the basis of graphite material) of a material having surface active effect (hereinafter referred to as "surface active effect material") which is at least one member elected from the group consisting of starch derivatives having a basic structure of $C_6H_{10}O_5$, viscous polysaccharides having a basic structure of $C_6H_{10}O_5$, water-soluble cellulose derivatives having a basic structure of $C_6H_{10}O_5$ and water-soluble synthetic resins.

Furthermore, the present invention provides the graphite material for the negative electrodes of lithium ion secondary cells, in which the graphite powder is coated with or adsorbs the above-mentioned surface active effect material can further contain 50 to 30,000 ppm of at least one alkali metal element or alkaline earth metal element selected from the group consisting of lithium, calcium, magnesium, sodium and potassium.

Another aspect of the present invention is to provide a method for producing the graphite powder for negative electrodes of lithium ion secondary cells, which method comprises the steps of adding graphite powder into an aqueous solution of a surface active effect material; dispersing the mixture with stirring; then filtering and drying the mixture, thereby obtaining the graphite material, in which 0.01 to 10 wt. % on the basis of the graphite material, of a surface active effect materials are adsorbed or coated. The above surface active effect material is, as described above, at least one member selected from the group consisting of starch derivatives having a basic structure of $C_6H_{10}O_5$, viscous polysaccharides having a basic structure of $C_6H_{10}O_5$, water-soluble cellulose derivatives having a basic structure of $C_6H_{10}O_5$ and water-soluble synthetic resins and the above graphite powder is exemplified by natural graphite, artificial graphite, kish graphite, mesophase carbon micro-beads (MCMB), mesophase carbon micro-fiber (MCF) and resin carbonized graphite which are able to occlude and release lithium ions.

In addition, by using the water containing lithium calcium, magnesium, sodium and potassium in the above method, the present invention further provides another method for producing graphite powder for negative electrodes of lithium ion secondary cells, in which the graphite powder contains 50 to 30,000 ppm of at least one alkali metal element or alkaline earth metal element selected from the group consisting of lithium, calcium, magnesium, sodium and potassium.

In this description, the above graphite powder used for negative electrodes of lithium ion secondary cells is sometimes simply referred to as "graphite powder" and the ordinary graphite which is used as the raw material for the graphite powder of this invention will be referred to "graphite material".

The graphite powder adsorbing or coated with various compounds in the present invention can be prepared by mixing graphite powder into an aqueous solution of the above compounds and by dispersing with stirring, which are followed by filtration and drying.

The graphite materials used in the present invention are exemplified by natural graphite, artificial graphite, kish graphite, mesophase carbon micro-beads (MCMB), mesophase carbon micro-fiber (MCF) and resin carbonized graphite. That is, they are optionally selected according to the structure of lithium ion secondary cell of the combination of positive electrode material, electrolyte and separators. Any of graphite materials which can occlude and release lithium ions can be used for the negative electrodes of lithium ion secondary cells.

The surface active effect materials to be adsorbed by or to be coated to the graphite material are exemplified by starch derivatives having a basic structure of $C_6H_{10}O_5$ such as acetic starch, phosphoric starch, carboxymethyl starch and hydroxyalkyl starch e.g. hydroxyethyl starch; viscous polysaccharides having a basic structure of $C_6H_{10}O_5$ such as pullulan and dextrine; water-soluble cellulose derivatives having a basic structure of $C_6H_{10}O_5$ such as carboxymethyl cellulose, methyl cellulose, hydroxyethyl cellulose and hydroxypropyl cellulose; and water-soluble synthetic resins such as water-soluble acrylic resin, water-soluble epoxy resin, water-soluble polyester resin and water-soluble polyamide resin. The aqueous solution of the surface active effect material can be prepared by dissolving one or more of them into water.

When the above graphite material is added into the above aqueous solution and it is dispersed by stirring, the fine primary particles agglomerate into secondary particles and the secondary particles turns into primary particles, at the same time, the surface active effect material electrically and chemically covers or be adsorbed by a large number of active sites existing on the surfaces of the latter primary particles. Therefore, the whole surfaces of primary particles of graphite material are covered by the surface active effect material.

The quantity required for covering the whole surfaces of primary particles of graphite material depends upon the surface area of the graphite particles, however, the quantity is generally preferable in the range of 0.01 to 10 wt. % on the basis of the quantity of graphite material.

If the quantity of surface active effect material adsorbed by or coated to the graphite material is less than 0.01 wt. %, the object of the present invention cannot be attained because the quantity is too small for producing the surface active effect and the active sites on the graphite material cannot always be covered. When the adsorption quantity or coating quantity is too small, the graphite material in the aqueous solution cannot be dispersed well. So that, the evaluation of the quantity of surface active effect material can easily be done by observing whether the graphite material is floating or not in the treating liquid.

With the increase in the adsorption or coating quantity of the surface active effect material to the graphite material, the characteristic properties as the graphite powder for negative electrodes of lithium ion secondary cells are improved, however, when the quantity exceeds 10 wt %, the properties are impaired because the electro-conductivity inherent in the graphite material is lowered and the quantity of occlusion of lithium ions by the graphite powder is reduced.

The quantity of adsorption or coating of the surface active effect material to the graphite material can be adjusted by controlling the concentration of the aqueous solution. When the concentration is set too high, it is possible to adjust the quantity of adsorption or coating by rinsing the filter cake of graphite material with water.

Meanwhile, the adsorption or coating quantity of surface active effect material can be adjusted to a certain level by employing X-ray spectrophotometric analysis. That is, when graphite material without the treatment of adsorption or coating is subjected to X-ray spectrophtometry, the value of $C_{1S}$ is 95–100 atomic % and $O_{1S}$, 0–5 atomic % in the surface atomic percentage of $C_{1S}$ and $O_{1S}$. In the case of the graphite material which is treated by the adsorption or coating of surface active effect material according to the present invention, the value of $C_{1S}$ is 85–95 atomic % and $O_{1S}$, 5–15 atomic %. This is due to the functional groups of carboxylic groups, carboxylic acid groups, ester groups and hydroxyl groups contained in the surface active effect material existing on the surface of graphite powder.

It is possible to improve the discharge capacity of lithium ions when the graphite material treated with the surface active effect material further contains the aforementioned element of alkali metal or alkaline earth metal. The effective quantity of the above element for the improvement in discharge capacity is 50 to 30,000 ppm. When the quantity of such element is less than 50 ppm, its additional effect cannot be produced. On the other hand, when the amount exceeds 30,000 ppm, the discharge capacity is rather lowered. The reason for this fact cannot yet be clarified, however, it is supposed as follows.

When a proper amount of the element of the above alkali metal or alkaline earth metal is adsorbed by or coated onto the surfaces of graphite powder, the metallic ions (cations) are electrically connected to negatively charged sites of the surface active effect material on the surfaces of graphite powder, so that the surfaces of graphite powder are electrically stabilized. Accordingly, the occlusion and releasing of lithium ions are facilitated, at the same time, the irreversible formation of lithium compound is suppressed.

As the method for adding further the above element to the graphite powder which adsorbs or coated with the surface active effect material, it is possible to add further the above-mentioned alkali metal or alkaline earth metal to the water to be used. More particularly, at least one member of the group consisting of inorganic acid salts such as hydroxides, chlorides, sulfides, bromides, oxides, iodides, sulfates, carbonates, nitrates, thiosulfates, acetates, perchlorides, citrates, tetraborates, oxalates, phosphates, lactates, sulfites, tartrates, nitrites, iodates of lithium, calcium, magnesium, sodium and potassium; or the salts of starch derivatives having a basic structure of $C_6H_{10}O_5$, the salts of viscous polysaccharides having a basic structure of $C_6H_{10}O_5$, the salts of water-soluble cellulose derivatives having a basic structure of $C_6H_{10}O_5$ and the salt of water-soluble acrylic resin, the salt of water-soluble epoxy resin, the salt of water-soluble polyester resin and the salt of water-soluble polyamide resin. In addition, it is also possible to use ion-exchanged water, hot-spring water, under ground water, well water and city water which contain any one of lithium, calcium, magnesium, sodium and potassium.

By using one of these water, the treatment and operation like the above-described process of coating or adsorption with the surface active effect material to obtain the graphite powder containing the above element. In other words, because these elements exist in water in the form of ions, they are contained in the graphite material together with the surface active effect material to obtain the graphite powder of the present invention.

By the way, the drying after the filtration must be done at a temperature in which the material adsorbing or coated with the surface active effect material is not thermally decomposed. According to the use of the graphite powder, when aqueous paint or other additive is usable, such additive can be added to the treating solution.

BEST MODE FOR CARRYING OUT THE INVENTION

The invention will be described in more detail with reference to examples. It should be noted that the present invention is not limited to the following examples and, within the scope of the invention, it can be put into practice with incorporating suitable modification.

METHOD FOR EVALUATION (1) Quantity of Adsorption/Coating for Graphite Material The quantity of adsorption/coating for graphite material was determined by calculating the thermal depletion with the weight of dried graphite powder ($W_1$) and the weight of the graphite powder which was dried in the air at 400° C. for 2 hours ($W_2$).

Quantity of Adsorption/Coating=$[(W_1-W_2)/W_1]\times 100$ (2) Method for Single-Pole Charging (Measuring Method of Charge and Discharge Capacity)

To 90 wt. parts of graphite powder was added into 100 wt. parts of a solution of polyvinylidene fluoride resin prepared by dissolving it in N-methyl-2-pyrolidone (solid content: 10 wt. %). The N-methyl-2-pyrolidone was further added to form the mixture into paste like material and then it was applied to a rolled copper foil of 18 µm in thickness using a doctor blade of 200 µm to form a coating film. It was then dried in a hot-air drying oven at 60° C. for 3 hours. After that, it was pressed under a pressure of 0.5 ton/cm² to form a coating of 100 µm in thickness on the copper foil. This coating was cut together with the copper foil into sample electrodes of 2 cm×2 cm and they were dried in vacuum at 120° C. for 3 hours. After that, a three-electrodes cell was made with feeding 2 ml of electrolyte in a dry box which was displaced with argon environment, with using the sample electrode (carbon-made or graphite-made working electrode), the lithium metal-made counter electrode, the reference electrode and porous membranes made of polypropylene as separators. The electrolytic solution was made by dissolving 1 mole/lit. of $LIPF_6$ as a supporting electrolyte into a 1:1 mixture of ethylene carbonate (EC) and diethyl carbonate (DEC).

The formed three-electrodes cell was connected to charge/discharge tester and the charging and discharging were started, (lithium ion intercalating into graphite is defined charging, and deintercalating from graphite is defined discharge). The Coulomb efficiency was determined by measuring charge capacities and discharge capacities. In this test, the charging was done at a constant current density of 0.1 mA/cm² and a terminal voltage of 0 V (vs. Li/Li$^+$) and the discharging was done at a constant current density of 0.1 mA/cm² and a terminal voltage of 2 V (vs. Li/Li$^+$).

Coulomb Efficiency [%]=Discharge Capacity/Charge capacity)×100

(3) Storage Characteristic as Lithium Ion Secondary Cell

A model cell was made by using a positive electrode made by coating $LiCoO_2$ onto aluminum foil, a negative electrode like the one as prepared in the above item (2) and an electrolytic solution as prepared in the above item (2). After that, charging was done and the discharge capacity ($Cap_1$) was measured under a current density of 0.2 C. Meanwhile, a charged model cell was left to stand still for 3 months in the environment of 40° C. The discharge capacity ($Cap_2$) was measured by discharging it at a current density of 0.2 C and the capacity retention rate was calculated with the following equation.

Capacity Retention Rate=$[(Cap_2)/(Cap_1)]\times 100$ (4) Quantities of Contained Elements The obtained graphite powder or graphite material was left intact in the air at 1000° C. for 2 hours so that the graphite content was completely burned off. With regard to the remainder material, the contents of alkali metal and alkaline earth metal contained in the graphite powder were measured by using ICP emission spectrometer.

EXAMPLE 1

A predetermined quantity of a starch derivative of phosphate starch was dissolved into 1 lit. of pure water and 100 g of flake graphite material having an average particle diameter of 8 µm was added thereto. It was stirred for 60 minutes with a homogenizer so as to disperse the contents. The treated liquid was filtered with #B5 filter paper. Meanwhile, the treated powders on the filter paper in Sample Nos. 13 and 15 were rinsed with water so as to reduce the quantities of adsorbed or coated phosphate starch on the flake graphite material. After that, they were dried at 120° C. for 3 hours in a thermostatic chamber to obtain graphite powder for evaluation.

The properties and evaluation results of these graphite powders are shown in the following Table 1. In the samples in which the adsorbed or coated phosphate starch is less than 0.01 wt. % relative to the flake graphite material, i.e., untreated powder (Sample No. 10) and graphite powder (Sample No. 11), the ratios of discharge and charge capacities (Coulomb efficiencies) were not more than 80% and the capacity retention rates were about 70%. On the other hand, when the quantities of adsorbing/coating of phosphate starch increased close to 0.01 wt. % and further increased (Sample Nos. 12–15), the Coulomb efficiency became about 90%. However, in the case that the quantity of adsorbing/coating was 14.5 wt. % (Sample No. 16), both the charge capacity and discharge capacity were markedly lowered.

TABLE 1

| Sample Number | Phosphate Content (g) | Adsorbing/Coating Qty. (wt. %) | Capacity (mAh/g) Charge | Capacity (mAh/g) Discharge | Coulomb Efficiency (%) | Capacity Retention Rate (%) |
|---|---|---|---|---|---|---|
| 10 | — | — | 473 | 328 | 75 | 69 |
| 11 | 0.008 | 0.007 | 434 | 330 | 76 | 70 |
| 12 | 0.01 | 0.009 | 389 | 338 | 87 | 78 |
| 13 | 1.0 | 0.53 | 390 | 351 | 90 | 80 |
| 14 | 5.0 | 4.9 | 379 | 345 | 91 | 80 |
| 15 | 30 | 9.4 | 382 | 336 | 88 | 82 |
| 16 | 15 | 14.5 | 334 | 277 | 83 | 82 |

EXAMPLE 2

A predetermined quantity of a viscous polysaccharide of pullulan was dissolved into 1 lit. of pure water and 100 g of artificial graphite having an average particle diameter of 9 $\mu$m was added thereto. It was stirred for 30 minutes with a homogenizer so as to disperse the contents. The treated liquid was filtered with a membrane filter of 0.2 $\mu$m in pore diameter to separate the treated powder from the medium. Meanwhile, with regard to Sample No. 25, the treated powder on the membrane filter was rinsed with water to reduce the quantities of adsorbed/coated pullulan on the artificial graphite. After that, the treated powder was dried by freeze-drying to obtain dried powder and it was used for evaluation in the like manner as in Example 1.

The determined quantities of adsorbed/coated pullulan in the treated powders and the results of evaluation in the use of treated powders are shown in the following Table 2. Also in the cases of artificial graphite as a carbon material, when the adsorbed/coated quantity of surface active effect material of pullulan was less than 0.01 wt. % (Sample Nos. 20, 21), the ratios of discharge capacities and charge capacities were large (Coulomb efficiencies were small), so that it was not suitable as a carbon material for negative electrodes in practical uses. On the other hand, when the quantity of adsorbed/coated pullulan was 0.015 wt. % (Sample No. 22) to 9.4 wt. % (Sample No. 25), the discharge capacities increased and the difference in discharge capacities were small. So that the improvement in the characteristics as cells was expected. In the case that the quantity of adsorbing/coating was 10.6 wt. % (Sample No. 26), both the charge capacity and discharge capacity were undesirably low.

TABLE 2

| Sample Number | Pullulan Content (g) | Adsorbing/Coating Qty. (wt. %) | Capacity (mAh/g) Charge | Capacity (mAh/g) Discharge | Coulomb Efficiency (%) | Capacity Retention Rate (%) |
|---|---|---|---|---|---|---|
| 20 | — | — | 384 | 311 | 81 | 72 |
| 21 | 0.009 | 0.008 | 386 | 313 | 81 | 72 |
| 22 | 0.02 | 0.015 | 392 | 345 | 88 | 80 |
| 23 | 0.5 | 0.48 | 388 | 357 | 92 | 83 |
| 24 | 3.0 | 2.9 | 382 | 359 | 94 | 84 |
| 25 | 11.0 | 9.4 | 385 | 354 | 92 | 84 |
| 26 | 11.0 | 10.6 | 305 | 268 | 88 | 80 |

EXAMPLE 3

A predetermined quantity of water-soluble cellulose of hydroxyethyl cellulose (HEC) was dissolved into 1 lit. of pure water and 100 g of graphitized mesophase carbon micro-beads (MCMB) having an average particle diameter of 6 $\mu$m were added thereto. It was stirred for 60 minutes with a propeller stirrer so as to disperse the contents. The treated liquid was treated with a spray drier to obtain dry powder and it was evaluated in the like manner as in Example 1.

The determined quantities of adsorbed/coated HEC in the treated powders and the results of evaluation in the use of treated powders are shown in the following Table 3. Also in the cases of the carbon material of graphitized MCMB, when the adsorbed/coated quantity of surface active effect material of HEC was less than 0.01 wt. % (Sample Nos. 30, 31), the ratios of charge capacities and discharge capacities were large (Coulomb efficiencies were small). On the other hand, when the quantities of adsorbed/coated HEC were in the range of 0.01 to 10 wt. % (Sample Nos. 32–35), the discharge. capacities increased and the difference in discharge capacities were small. So that the improvement in the characteristics as cells was expected.

TABLE 3

| Sample Number | Content of Hydroxyethyl Cellulose (HEC) (g) | Adsorbing/Coating Qty. (wt. %) | Capacity (mAh/g) Charge | Capacity (mAh/g) Discharge | Coulomb Efficiency (%) | Capacity Retention Rate (%) |
|---|---|---|---|---|---|---|
| 30 | — | — | 286 | 240 | 84 | 75 |
| 31 | 0.01 | 0.009 | 295 | 242 | 82 | 75 |
| 32 | 0.02 | 0.018 | 281 | 250 | 89 | 82 |
| 33 | 1.5 | 1.4 | 287 | 267 | 93 | 86 |
| 34 | 7.0 | 6.8 | 287 | 270 | 94 | 88 |
| 35 | 10.0 | 9.9 | 287 | 270 | 94 | 88 |
| 36 | 15.0 | 4.7 | 246 | 219 | 89 | 86 |

EXAMPLE 4

A predetermined quantity of 1:1 mixture of a starch derivative of acetate starch and water-soluble synthetic acrylic resin was dissolved into 1 lit. of pure water and 100 g of pitch coke was added thereto. It was stirred for 120 minutes with a homogenizer so as to disperse the contents. The treated liquid was filtered with #5B filter paper to separate the treated powder from the medium. The treated powder was dried with a spray drier to obtain dry powder and it was evaluated in the like manner as in Example 1.

The determined quantities of adsorbed/coated surface active effect materials in the treated powders and the results of evaluation in the use of treated powders are shown in the following Table 4. Also in the cases of the carbon material of pitch coke, when the adsorbed/coated quantity of surface active effect material was less than 0.01 wt. % (Sample Nos. 40, 41), the ratios of discharge capacities and charge capacities were large (Coulomb efficiencies were small). On the other hand, when the quantities of adsorbed/coated surface active effect material are in the range of 0.01 to 10 wt. % (Sample Nos. 42–35), the discharge capacities increased and the difference in discharge capacities were small.

TABLE 4

| Sample Number | Contents of Acetate Starch + Acrylic Resin (g) | Adsorbing/ Coating Qty. (wt. %) | Capacity (mAh/g) Charge | Capacity (mAh/g) Discharge | Coulomb Efficiency (%) | Capacity Retention Rate (%) |
|---|---|---|---|---|---|---|
| 40 | — | — | 340 | 250 | 74 | 78 |
| 41 | 0.01 | 0.009 | 338 | 250 | 74 | 79 |
| 42 | 0.02 | 0.018 | 350 | 280 | 80 | 89 |
| 43 | 1.5 | 1.4 | 366 | 300 | 82 | 89 |
| 44 | 7.0 | 6.8 | 351 | 305 | 87 | 90 |
| 45 | 10.0 | 9.9 | 341 | 300 | 88 | 88 |
| 46 | 15.0 | 14.7 | 235 | 200 | 85 | 86 |

EXAMPLE 5

To 1 lit. of water was added 3 g of a viscous polysaccharide of pullulan and 100 g of artificial graphite material having an average particle diameter of 9 μm was then added thereto. It was stirred for 30 minutes with a homogenizer to disperse it. The treating solution was filtered with a membrane filter of 0.2 μm in pore diameter to separate the treated powder from the medium. After that, the treated powder was dried by freeze-drying to obtain dried graphite powder and it was used for evaluation. In Sample No. 100, the raw material powder itself for the artificial graphite material was evaluated. It contained neither alkali metal nor alkaline earth metal and the pullulan was not coated.

The quantity of adsorbed/coated pullulan in all the samples was about 3 wt. % except Sample No. 100. The practically determined values of the above-mentioned metals in graphite powders and the evaluation of discharge capacities obtained by using the respective graphite powders are shown in the following Table 5. As will be understood in view of Sample No. 100, even when artificial graphite is used as shown in Examples 1 to 4, the discharge capacity of the raw material powder itself without the coating of pullulan was low and any practically effective property could not be obtained. In addition, it was understood that trace amounts of metallic components are also contained in the artificial graphite material.

The aqueous medium in Sample No. 101 was pure water likewise in Example 2 and it indicates the effect of pullulan. Even though the effect of the use of surface active effect material was observed, however, the discharge capacity did not reach the theoretical value of 372 mAh/g of the graphite for the negative electrode of lithium ion secondary cell.

On the contrary, in Sample Nos. 102, 103, 105–108, 110, 112, 113, 115, 116, 118 and 119, in which the treatment with aqueous solutions containing the compound of lithium, calcium, magnesium, sodium or potassium was done, the discharge capacities were high.

Furthermore, in the graphite powders (Sample Nos. 104, 109, 111, 114 and 117) containing large quantity (30,000 ppm or more) of lithium, calcium, magnesium, sodium or potassium, the lowering of discharge capacities were observed.

Still further, in the column of "Used Aqueous Medium" in Sample Nos. 102 to 117 in Table 5, the mainly used salts of alkali metals and alkaline earth are indicated.

TABLE 5

| Sample Number | Used Aqueous Medium | Contained Elements [ppm] Li | Ca | Mg | Na | K | Discharge Capacity [mAh/g] |
|---|---|---|---|---|---|---|---|
| 100 | — | 2 | 29 | 12 | 2 | 5 | 268 |
| 101 | Pure water | 1 | 30 | 10 | 4 | 4 | 359 |
| 102 | LiOH | 60 | 20 | 15 | 4 | 5 | 377 |
| 103 | LiOH | 29500 | 28 | 32 | 5 | 7 | 369 |
| 104 | LiOH | 32000 | 23 | 12 | 2 | 4 | 332 |
| 105 | CaSO$_4$ | 1 | 70 | 10 | 3 | 10 | 376 |
| 106 | CaSO$_4$ | 3 | 2600 | 12 | 38 | 58 | 379 |
| 107 | CaSO$_4$ | 2 | 7200 | 80 | 8 | 9 | 380 |
| 108 | CaSO$_4$ | 30 | 13000 | 10 | 2580 | 34 | 380 |
| 109 | CaSO$_4$ | 25 | 33000 | 9 | 7 | 5 | 326 |
| 110 | MgSO$_4$ | 3 | 63 | 29800 | 3 | 10 | 386 |
| 111 | MgSO$_4$ | 5000 | 9060 | 34000 | 570 | 55 | 338 |
| 112 | NaCl | 20 | 19 | 32 | 60 | 19 | 389 |
| 113 | Sodium Polyacrylate | 5 | 26 | 49 | 1600 | 250 | 373 |
| 114 | Sodium Polyacrylate | 1 | 19 | 35 | 40000 | 10 | 329 |
| 115 | K$_2$CO$_3$ | 8 | 33 | 15 | 12 | 55 | 367 |
| 116 | K$_2$CO$_3$ | 2 | 49 | 9 | 10 | 120 | 380 |
| 117 | K$_2$CO$_3$ | 5 | 29 | 950 | 12 | 38000 | 333 |
| 118 | Mineral water | 30 | 250 | 560 | 300 | 780 | 369 |
| 119 | Well water | 2 | 186 | 260 | 35 | 60 | 371 |

INDUSTRIAL APPLICABILITY

The graphite powder for a negative electrode of a lithium ion secondary cell of the present invention, adsorbs or coated with a surface active material or with both the surface active material and at least one kind of metal elements selected from the group consisting of lithium, calcium, magnesium, sodium and potassium. By using this graphite powder, it is possible to produce a lithium ion secondary cell of high discharge capacity, which cell has excellent ratio of discharge capacity and charge capacity (Coulomb efficiency), high capacity retention rate and long-term storage stability.

What is claimed is:

1. A graphite material for use in forming a negative electrode of a lithium ion secondary cell which is capable of occluding or releasing lithium ions, wherein said graphite material has adsorbed or is coated with a layer of surface active material that (1) has not been graphitized by heat treatment and (2) consists essentially of at least one member selected from the group consisting of acetic starch, phosphoric starch, carboxymethyl starch and hydroxyalkyl starch wherein the amount of said surface active material is present in a range of 0.01 to 10.0 wt. % based upon the weight of graphite material.

2. A graphite material for use in forming a negative electrode of a lithium ion secondary cell which is capable of occluding or releasing lithium ions, wherein said graphite material has adsorbed or is coated with a layer of surface active material that (1) has not been graphitized by heat treatment and (2) consists essentially of at least one member selected from the group consisting of pullulan and dextrine, wherein the amount of said surface active material is present in a range of 0.01 to 10 wt. % based upon the weight of graphite material.

* * * * *